(12) United States Patent
Yuan (10) Patent No.: US 10,999,084 B2
(45) Date of Patent: May 4, 2021

(54) LEVERAGING REMOTE DIRECT MEMORY ACCESS (RDMA) FOR PACKET CAPTURE

(71) Applicant: Microsoft Technology Licensing, LLC, Redmond, WA (US)

(72) Inventor: Lihua Yuan, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/428,110

(22) Filed: May 31, 2019

(65) Prior Publication Data

US 2020/0382329 A1 Dec. 3, 2020

(51) Int. Cl.
| | | |
|---|---|---|
| *H04L 12/06* | (2006.01) | |
| *G06F 13/28* | (2006.01) | |
| *H04L 12/24* | (2006.01) | |
| *H04L 12/741* | (2013.01) | |
| *H04L 29/06* | (2006.01) | |

(52) U.S. Cl.
CPC .............. *H04L 12/06* (2013.01); *G06F 13/28* (2013.01); *H04L 41/12* (2013.01); *H04L 45/74* (2013.01); *H04L 69/16* (2013.01)

(58) Field of Classification Search
CPC ............. G06F 11/3433; G06F 9/45541; H04L 43/106; H04L 43/0817; H04L 47/127; H04L 45/7457
See application file for complete search history.

(56) References Cited

U.S. PATENT DOCUMENTS

| | | |
|---|---|---|
| 6,721,806 B2 | 4/2004 | Boyd et al. |
| 8,762,476 B1 | 6/2014 | Evans et al. |
| 9,553,808 B1 * | 1/2017 | Sites ...................... H04L 69/22 |
| 9,558,351 B2 | 1/2017 | Dalai et al. |
| 2006/0143311 A1 | 6/2006 | Madukkarumukumana et al. |
| 2014/0280737 A1 | 9/2014 | Bicket et al. |
| 2017/0187629 A1 | 6/2017 | Shalev et al. |
| 2017/0357611 A1 | 12/2017 | Cherian et al. |
| 2018/0373429 A1 * | 12/2018 | Yamamoto .............. G06F 3/061 |
| 2019/0079897 A1 | 3/2019 | Kochevar-cureton et al. |
| 2020/0084150 A1 * | 3/2020 | Burstein ............... H04L 47/283 |

OTHER PUBLICATIONS

Hjelmvik, Erik, "Detecting TOR Communication in Network Traffic", Retrieved from: https://www.netresec.com/?page=Blog&month=2013-04&post=Detecting-TOR-Communication-in-Network-Traffic, Apr. 6, 2013, 3 Pages.
"International Search Report and Written Opinion Issued in PCT Application No. PCT/US2020/029162", dated Jul. 10, 2020, 16 Pages.

* cited by examiner

*Primary Examiner* — Iqbal Zaidi
(74) *Attorney, Agent, or Firm* — Mark K. Young; Mayer & Williams, PC (57) ABSTRACT

Remote direct memory access (RDMA) enables access to a memory resource on a computing device without involving the device's CPU (central processing unit). Data packets traversing a NIC (network interface controller/card) on a server in a network are efficiently captured by adapting an ASIC (application-specific circuit) in a programmable TOR (top of rack) switch to modify headers of incoming data packets to indicate to the NIC that the packets are RDMA packets. Such modification enables the packets to be written directly to the server memory while bypassing the server's CPU which can typically act as a bottleneck when attempting full packet capture.

20 Claims, 12 Drawing Sheets

LEVERAGING REMOTE DIRECT MEMORY ACCESS (RDMA) FOR PACKET CAPTURE

BACKGROUND

Packet capture typically helps to diagnose anomalies, both reactively and proactively, in computing environments such as cloud computing and enterprise networking. Other uses include gathering network statistics, gaining information on network intrusions, debugging client-server communications, and facilitating maintenance of network infrastructure and associated software.

SUMMARY

Remote direct memory access (RDMA) enables access to a memory resource on a computing device without involving the device's CPU (central processing unit). Data packets traversing a NIC (network interface controller/card) on a server in a network are efficiently captured by adapting an ASIC (application-specific integrated circuit) in a programmable TOR (top of rack) switch to modify headers of incoming data packets to indicate to the NIC that the packets are RDMA packets. Such modification enables the packets to be written directly to the server memory while bypassing the server's CPU which can typically act as a bottleneck when attempting full packet capture.

In some implementations, the TOR switch can be configured to use the SONiC (Software for Open Networking in the Cloud) network operating system (OS) software. SONiC can be extended to perform the packet modifications (in combination with ASIC firmware in some cases) to include the RDMA information. Leveraging RDMA can advantageously enable packet capture at line rates (e.g., 40 Gb/s) to facilitate network forensics and critical incident response which can require full packet capture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
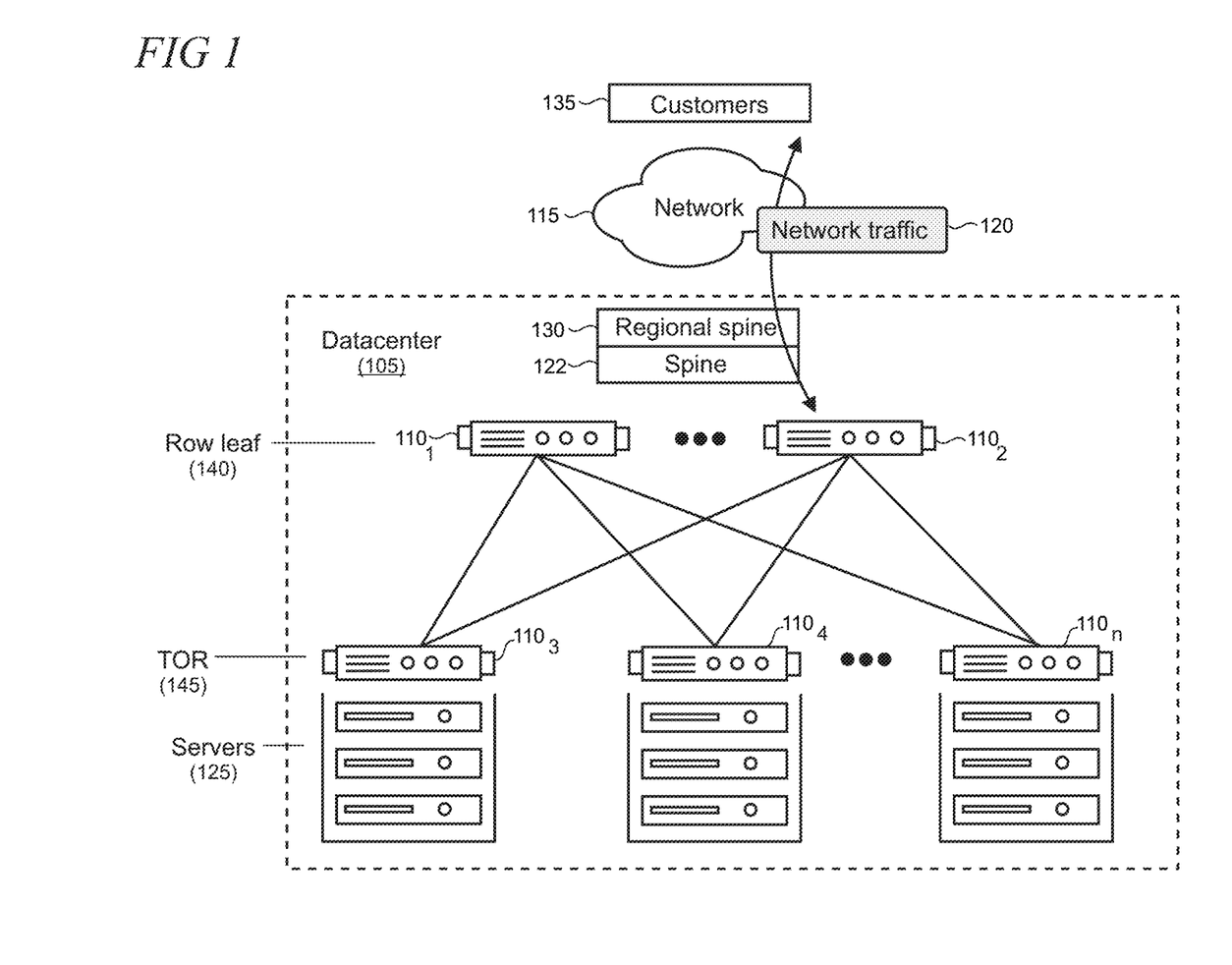
FIG. 1 shows an illustrative datacenter environment.

FIG. 1 shows an illustrative datacenter 105 environment in which multiple physically embodied networking devices, such as routers and switching devices 110, are configured to route incoming network traffic 120 to servers 125 which may be operating as part of a cloud service infrastructure. For example, the servers may be configured to host virtual machines to remotely provide solutions to customers, such as analytics, artificial intelligence (AI) processing, data storage, etc. The network infrastructure may span from the customers 135—e.g., the customer computing devices (not shown) that access the servers 125—over a network 115 to switching devices and servers that are variously located in the datacenter in racks and bays including a regional spine 130, spine 122, row leaf 140, and top of rack (TOR) 145. In some embodiments, the switching devices 110 may be configured using a Clos topology. The datacenter devices and layout are illustrative and can vary from that shown according the needs of a particular implementation of packet capture.

Figure 2:
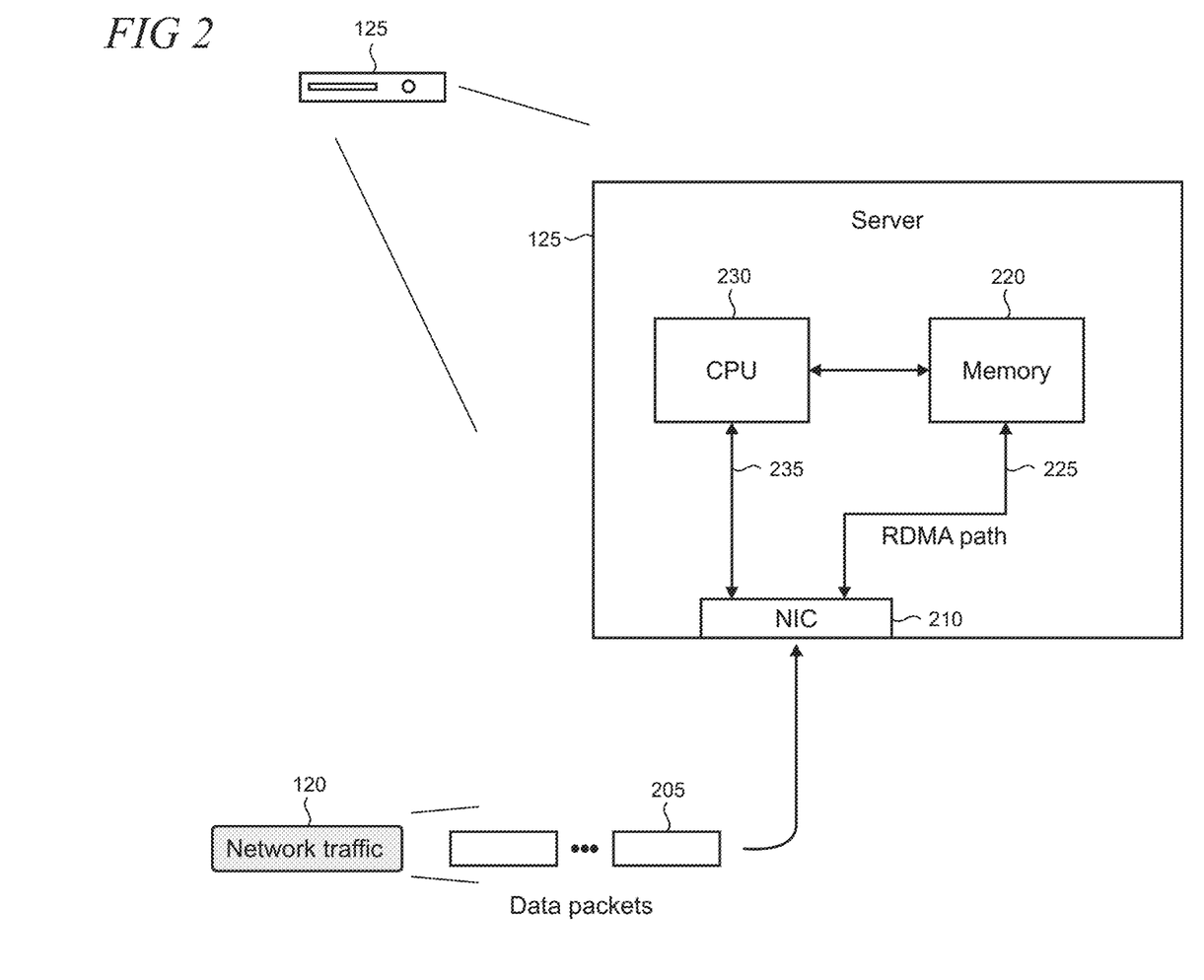
FIG. 2 shows details of an illustrative server.

As shown in FIG. 2, the network traffic 120 includes data packets 205 that are carried using TCP/IP (transport control protocol/Internet protocol). Handling the packets at the server 125 typically requires copy operations, which add latency and consume significant CPU (central processing unit) and memory resources in the datacenter 105. Utilization of the remote direct memory access (RDMA) protocol enables removal of data copy operations and enables reduction in latencies by allowing an application on a customer computing device to read or write data on a remote server's memory with minimal demands on memory bus bandwidth and CPU processing overhead, while preserving memory protection semantics. The RDMA protocol is described in the RFC 5040 specification published by the Internet Engineering Task Force (IETF) and is built on the direct data placement (DDP) protocol as described in the RFC 5041 specification.

A network interface controller (NIC) 210 in the server 125 provides an interface to receive the data packets 205 at some nominal line rate (e.g., 10 Gb/s, 40 Gb/s . . . ). For RDMA traffic, the NIC can write packets directly to a memory 220 in the server over an RDMA path 225 and thus bypass the CPU 230. For other, non-RDMA traffic, the NIC interacts with CPU and/or buffers (not shown) as indicated by line 235 to write data to the memory.

Figure 3:
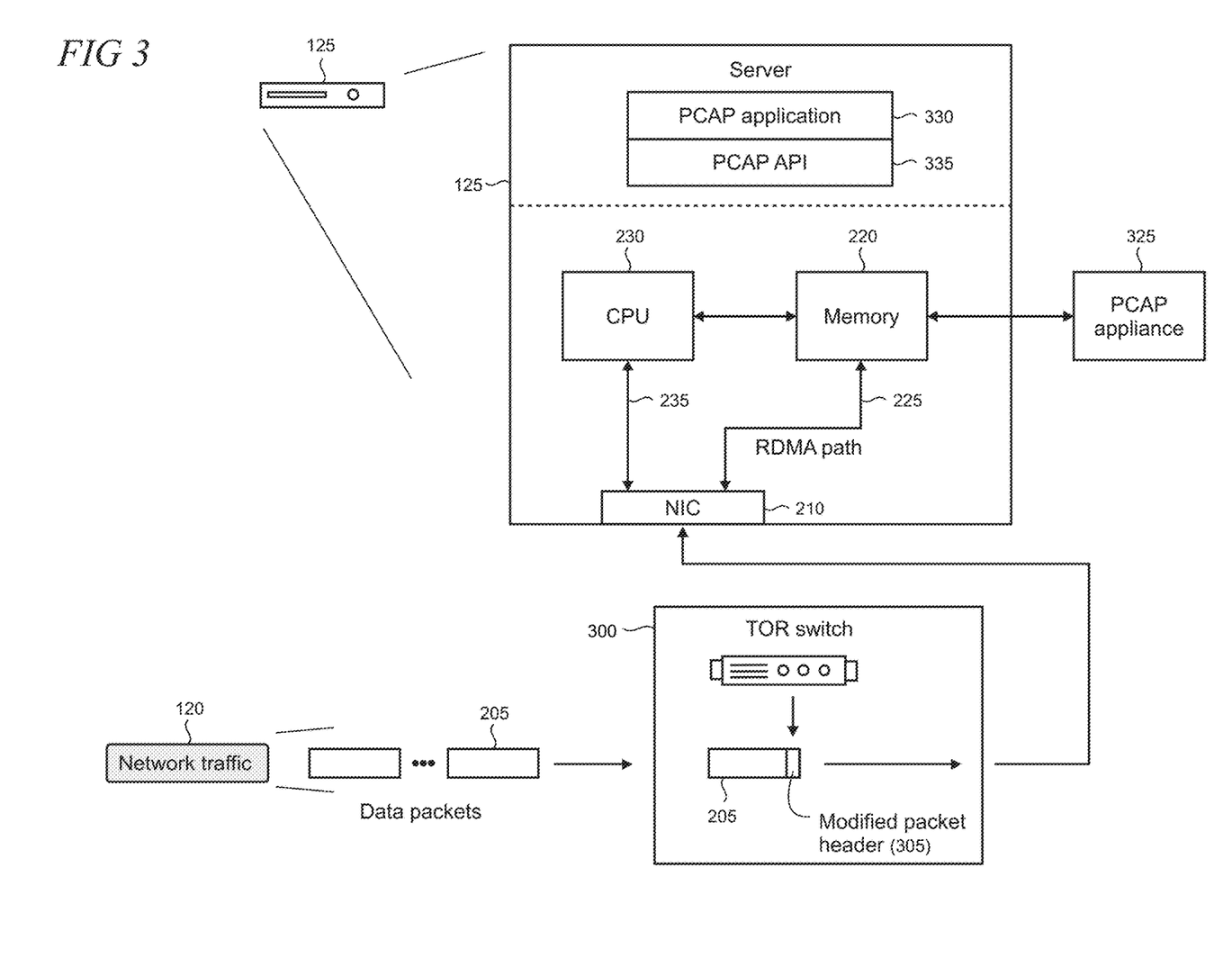
FIG. 3 shows an illustrative top of rack (TOR) switch that modifies incoming data packets to be handled by the server using remote direct memory access (RDMA)

FIG. 3 shows an illustrative top of rack (TOR) switch 300 that modifies incoming data packets 205 to be handled by NIC 210 in the server 125 using RDMA. The modification includes changes to the packet header, as discussed in more detail below, to identify the packets to the NIC as RDMA packets. Thus, when the NIC processes the modified packet header 305, it will direct the packet to the memory 220 over the RDMA path 225. Utilization of RDMA enables avoidance of the bottleneck that is ordinarily presented by operations of the CPU 230 in writing data to memory. Accordingly, as the NIC can process the incoming network traffic at the line rate, a packet capture (PCAP) appliance 325 can archive and analyze 100 percent of the traffic irrespective of packet processing functions such as filtering and classification. In alternative implementations the PCAP appliance is not utilized. Instead, a PCAP application 330 may be configured for operations with a PCAP API 335 or other suitable interface with the TOR switch hardware including the CPU and memory to implement various packet capture analyses and functionalities.

The PCAP appliance 325 or the application 330 can be supported in the datacenter 105 (FIG. 1) to analyze and archive network traffic 120 (FIG. 1) in full including both the headers and payload. Packet capture can be utilized, for example, for purposes of network troubleshooting, maintenance, forensics, and security. In some implementations, the PCAP appliance and application can be configured to capture a subset of the network traffic based on a set of user-definable filters, for example, IP address or MAC (media access control) address. However, analyses for network forensics and responses to incidents such as malicious intrusions typically require full packet capture.

Figure 4:
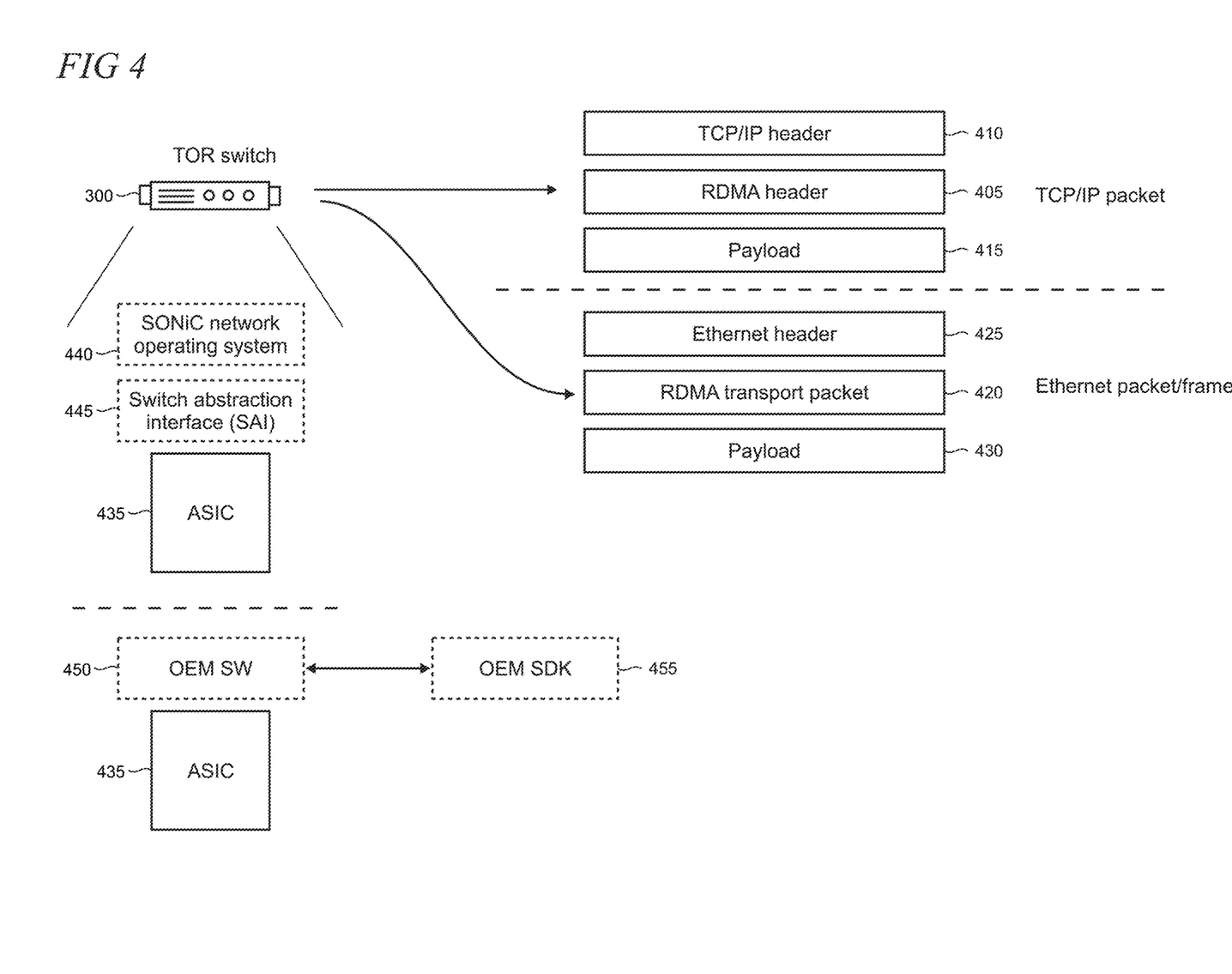
FIG. 4 shows the TOR switch performing data packet modifications in TCP/IP (transport control protocol/Internet protocol) and Ethernet scenarios.

As shown in FIG. 4, the TOR switch 300 may, in some implementations, comprise an ASIC 435 that is configured to interoperate with an instance of SONiC (Software for Open Networking in the Cloud) that functions as a network operating system (OS) 440, and a switch abstraction interface (SAI) 445). The SONiC network OS and SAI are optionally utilized as indicated by the dashed rectangles in FIG. 4. SONiC is an exemplary open source network OS based on Linux® which utilizes multiple containerized components that can facilitate extensibility, scalability, and customization. The SAI can provide a standard interface which enables disaggregation between the ASIC hardware and other software components in the TOR switch. The SAI may include a set of standardized application programming interfaces (APIs) to facilitate communication between the containers and other network applications using the network OS and switching devices 110 (FIG. 1) to thereby enable disaggregation. In some implementations, the TOR switch may comprise a hardware platform that is operated using OEM (original equipment manufacturer) software 450. For example, the OEM software may be configured using an OEM SDK (software development kit) 455 to implement the RDMA header modifications described herein.

FIG. 4 shows the TOR switch 300 performing data packet modifications in TCP/IP (Transport Control Protocol/Internet Protocol) and Ethernet scenarios. The TOR switch may perform the operations, for example, under control of the SONiC network OS alone, or in combination with firmware that operates on the ASIC 435. For TCP/IP, the TOR switch can insert an RDMA header 405 into a data packet that includes a TCP/IP header 410 and payload 415 (the packet structures shown here are simplified for clarity of exposition). For Ethernet, the TOR switch can encapsulate an RDMA transport packet 420 in an Ethernet frame to accompany a header 425 and payload 430.

RDMA may be implemented using various network protocols. For example, RDMA can be implemented using the TCP/IP protocol. RDMA over converged Ethernet (RoCE) is a network protocol that enables RDMA over an Ethernet network by defining how it will perform in such an environment. RoCE includes versions 1 and 2. The later version 2 provides packet encapsulation to include IP and UDP (user datagram protocol) headers so that RDMA can be used in both L2 and L3 networks (for example, to implement Layer 3 routing). Internet wide area RDMA protocol (iWARP) leverages the TCP protocol or stream control transmission protocol (SCTP) to transmit data. The iWARP methodology was developed by the IETF to enable applications on a server to read or write directly to applications executing on another server without support from the operating system on either server. InfiniBand provides another standard RDMA protocol for high-speed InfiniBand network connections.

Figure 5:
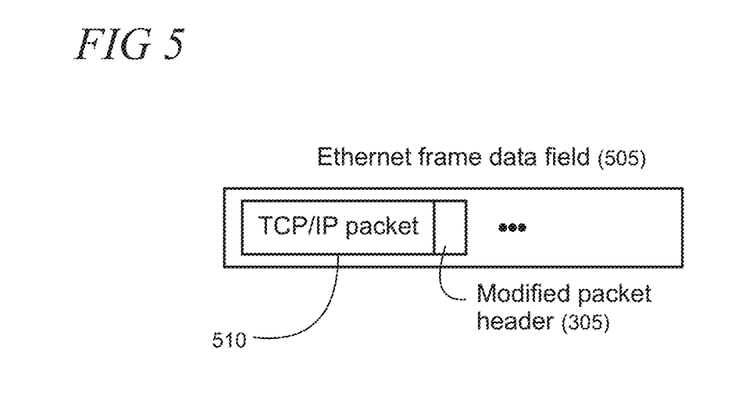
FIG. 5 shows an illustrative Ethernet frame carrying TCP/IP packets with an RDMA header.
Figure 6:
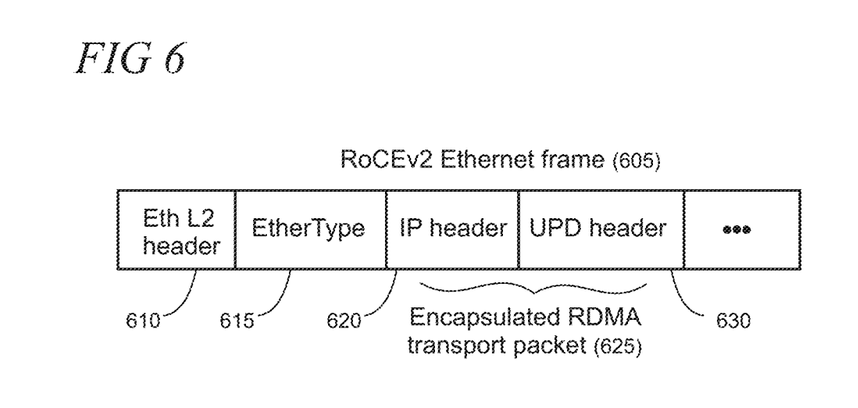
FIG. 6 shows an illustrative Ethernet frame that includes an encapsulated RDMA transport packet.

Two exemplary data packet structures, as modified by the TOR switch 300 (FIG. 3), to leverage RDMA for packet capture are shown in FIGS. 5 and 6. FIG. 5 shows an illustrative data field of an Ethernet frame 505 transporting TCP/IP packets 510 with a modified packet header 305 that includes RDMA information. FIG. 6 shows an illustrative Ethernet frame that includes an encapsulated RDMA transport packet 625 using RoCEv2 which encapsulates an RDMA transport packet 625 within an Ethernet/IPv4/UDP packet/frame 605 that includes an L2 header 610 and a EtherType 615. As shown, the encapsulated RMDA transport packet includes an IP header 620 and a UDP header 630. These data packet structures are exemplary, and other structures may be utilized to meet the needs of a particular RDMA packet capture implementation.

Figure 7:
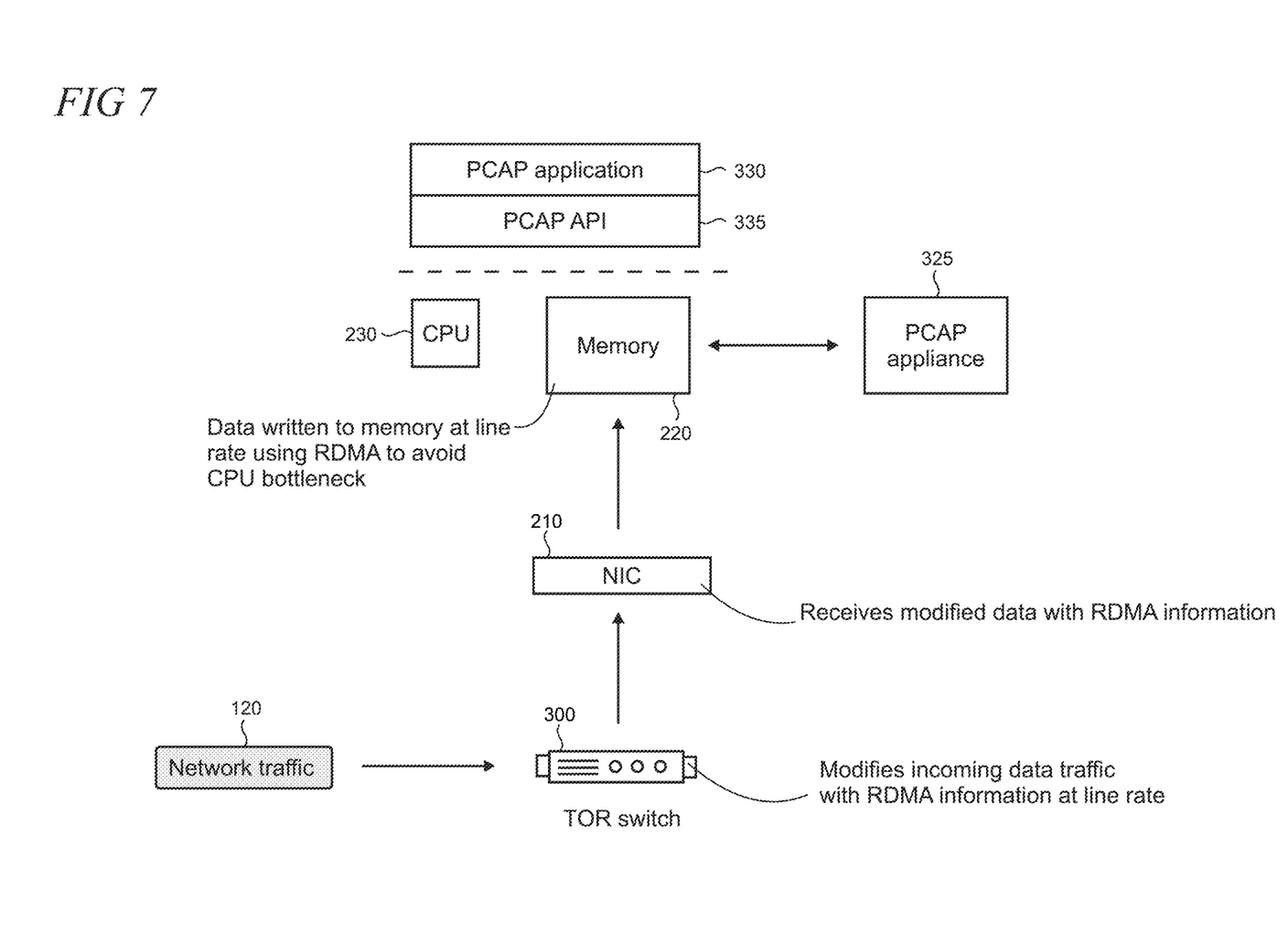
FIG. 7 shows a network interface controller (NIC) that writes RDMA data packets directly to memory to thereby avoid a bottleneck at a central processing unit (CPU)

FIG. 7 shows an overall view of the present leveraging of RDMA for packet capture. Network traffic 120 is received at the TOR switch 300 having an associated line rate. The TOR switch modifies the incoming data traffic to include the RDMA information. The modification is dynamically performed at the incoming data line rate. The modified data packets are received at the NIC 210 which writes the data packets directly to the memory 220 to avoid the bottleneck that is otherwise presented by the server CPU when RDMA is not utilized. Various packet capture functionalities, such as troubleshooting and other analyses, can be performed in full by either the PCAP application 330 or the PCAP appliance 325 on the data that is captured at the line rate.

Figure 8:
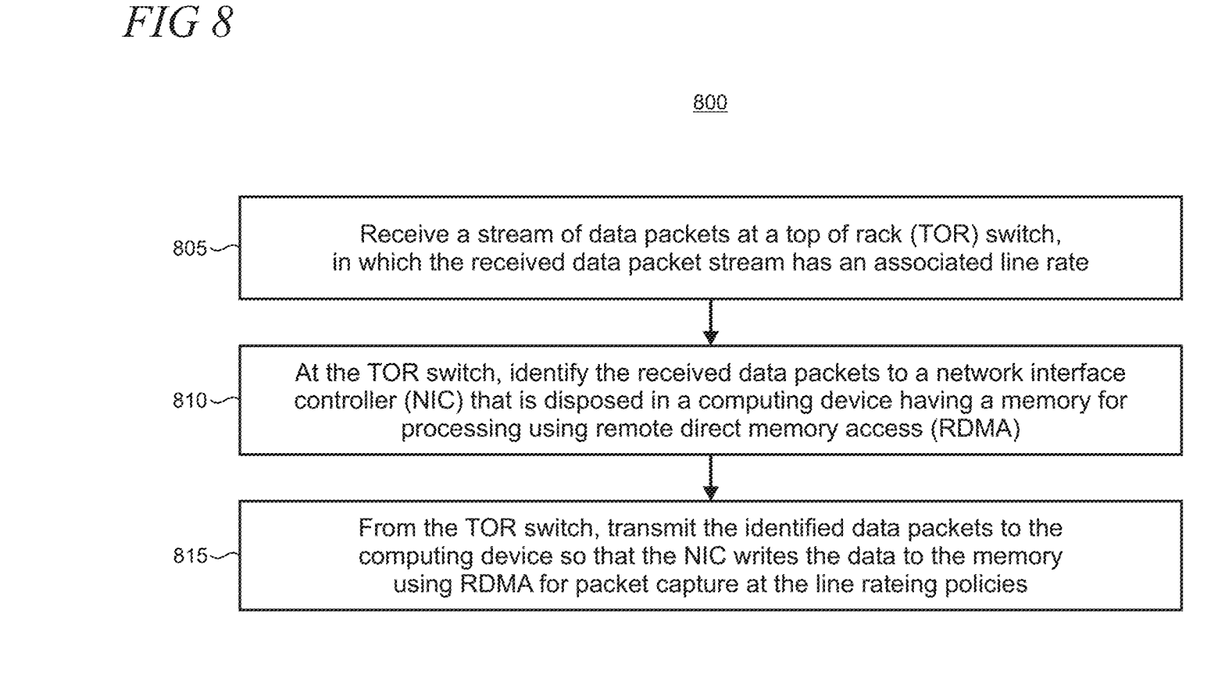
FIGS. 8-10 are flowcharts of illustrative methods.

FIG. 8 is a flowchart of an illustrative method 800 that may be performed by a switch (e.g., TOR switch 300 in FIG. 3). Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 805, a stream of data packets is received at a (TOR) switch, in which the received data packet stream has an associated line rate. At block 810 at the TOR switch, the received data packets are identified to a NIC for processing that is disposed in a computing device (e.g., server 120 in FIG. 1) having a memory using RDMA. At block 815, from the TOR switch, the identified data packets are transmitted to the computing device so that that the NIC writes the data to the memory using RDMA for packet capture at the line rate.

Figure 9:
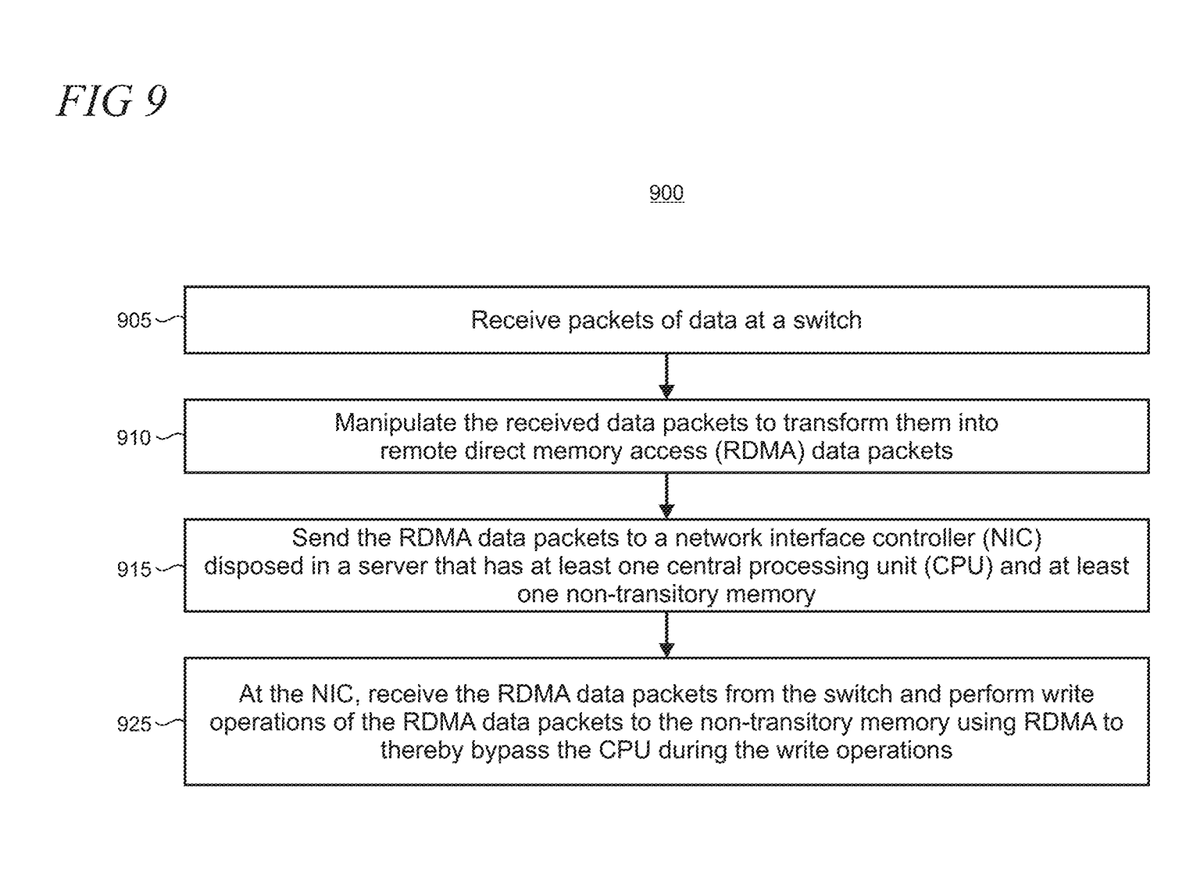

FIG. 9 is a flowchart of an illustrative method 900 that may be performed at a datacenter (e.g., datacenter 105 in FIG. 1). At block 905, packets of data are received at the switch. At block 910, the received data packets are manipulated to transform them into RDMA data packets. At block

910, the RDMA data packets are sent to a NIC disposed in a server that has at least CPU and at least one non-transitory memory. At block 915, at the NIC, the RDMA packets are received from the switch and the NIC performs write operations of the RDMA packets to the non-transitory memory using RDMA to thereby bypass the CPU during the write operations.

Figure 10:
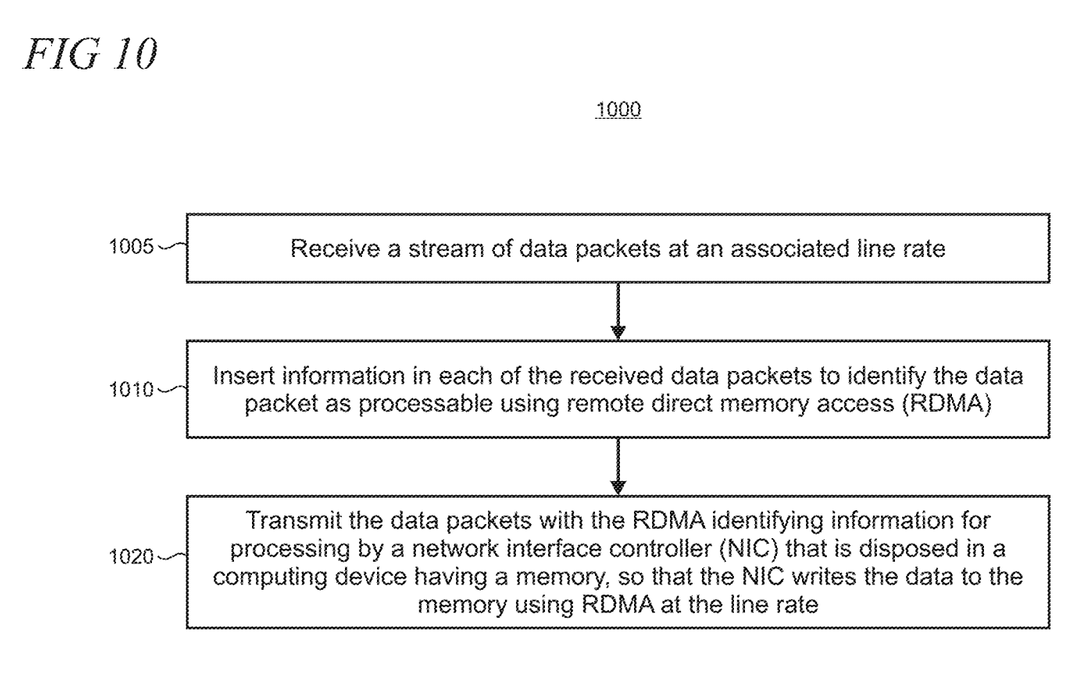
Figure 11:
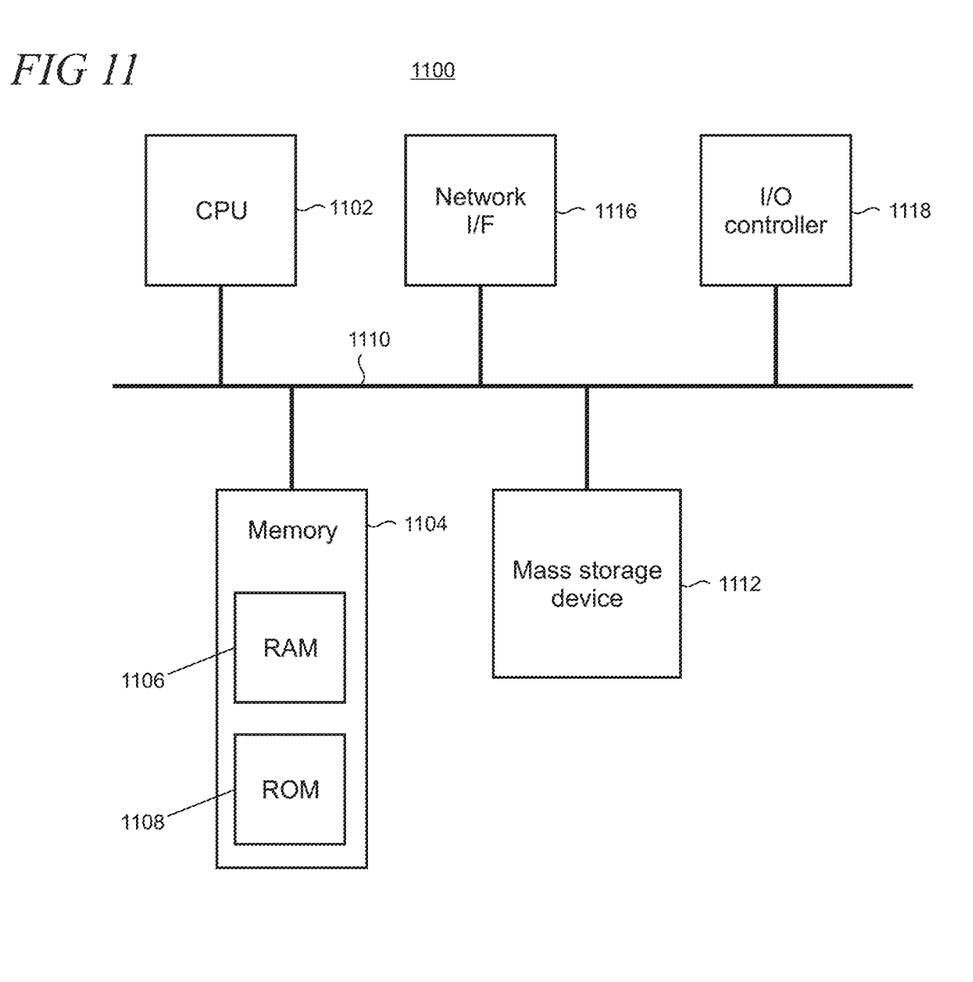
FIG. 11 is a block diagram of an illustrative server that may be used at least in part to implement the present leveraging of RDMA for packet capture.

FIG. 10 is a flowchart of an illustrative method 1000 that may be performed by a switch (e.g., TOR switch 300 in FIG. 3). At block 1005, a stream of data packets is received at a line rate. At block 1010, information is inserted into each of the received data packets to identify the data packet as processable using RDMA. At block 1015, the data packets with the RDMA identifying information are transmitted to the NIC for processing, in which the NIC is disposed in a computing device (e.g., server 120 in FIG. 1) having a memory, so that the NIC writes the data to the memory using RDMA at the line rate FIG. 11 shows an illustrative architecture 1100 for a device, such as a server, capable of executing the various components described herein for the present leveraging of RDMA for packet capture. The architecture 1100 illustrated in FIG. 11 includes one or more processors 1102 (e.g., central processing unit, dedicated AI chip, graphic processing unit, etc.), a system memory 1104, including RAM (random access memory) 1106 and ROM (read only memory) 1108, and a system bus 1110 that operatively and functionally couples the components in the architecture 1100. A basic input/output system containing the basic routines that help to transfer information between elements within the architecture 1100, such as during startup, is typically stored in the ROM 1108. The architecture 1100 further includes a mass storage device 1112 for storing software code or other computer-executed code that is utilized to implement applications, the file system, and the operating system. The mass storage device 1112 is connected to the processor 1102 through a mass storage controller (not shown) connected to the bus 1110. The mass storage device 1112 and its associated computer-readable storage media provide non-volatile storage for the architecture 1100. Although the description of computer-readable storage media contained herein refers to a mass storage device, such as a hard disk or CD-ROM drive, it may be appreciated by those skilled in the art that computer-readable storage media can be any available storage media that can be accessed by the architecture 1100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1100.

According to various embodiments, the architecture 1100 may operate in a networked environment using logical connections to remote computers through a network. The architecture 1100 may connect to the network through a network interface unit 1116 connected to the bus 1110. It may be appreciated that the network interface unit 1116 also may be utilized to connect to other types of networks and remote computer systems. The architecture 1100 also may include an input/output controller 1118 for receiving and processing input from a number of other devices, including a keyboard, mouse, touchpad, touchscreen, control devices such as buttons and switches or electronic stylus (not shown in FIG. 11). Similarly, the input/output controller 1118 may provide output to a display screen, user interface, a printer, or other type of output device (also not shown in FIG. 11).

It may be appreciated that the software components described herein may, when loaded into the processor 1102 and executed, transform the processor 1102 and the overall architecture 1100 from a general-purpose computing system into a special-purpose computing system customized to facilitate the functionality presented herein. The processor 1102 may be constructed from any number of transistors or other discrete circuit elements, which may individually or collectively assume any number of states. More specifically, the processor 1102 may operate as a finite-state machine, in response to executable instructions contained within the software modules disclosed herein. These computer-executable instructions may transform the processor 1102 by specifying how the processor 1102 transitions between states, thereby transforming the transistors or other discrete hardware elements constituting the processor 1102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1100 in order to store and execute the software components presented herein. It also may be appreciated that the architecture 1100 may include other types of computing devices, including wearable devices, handheld computers, embedded computer systems, smartphones, PDAs, and other types of computing devices known to those skilled in the art. It is also contemplated that the architecture 1100 may not include all of the components shown in FIG. 11, may include other components that are not explicitly shown in FIG. 11, or may utilize an architecture completely different from that shown in FIG. 11.

Figure 12:
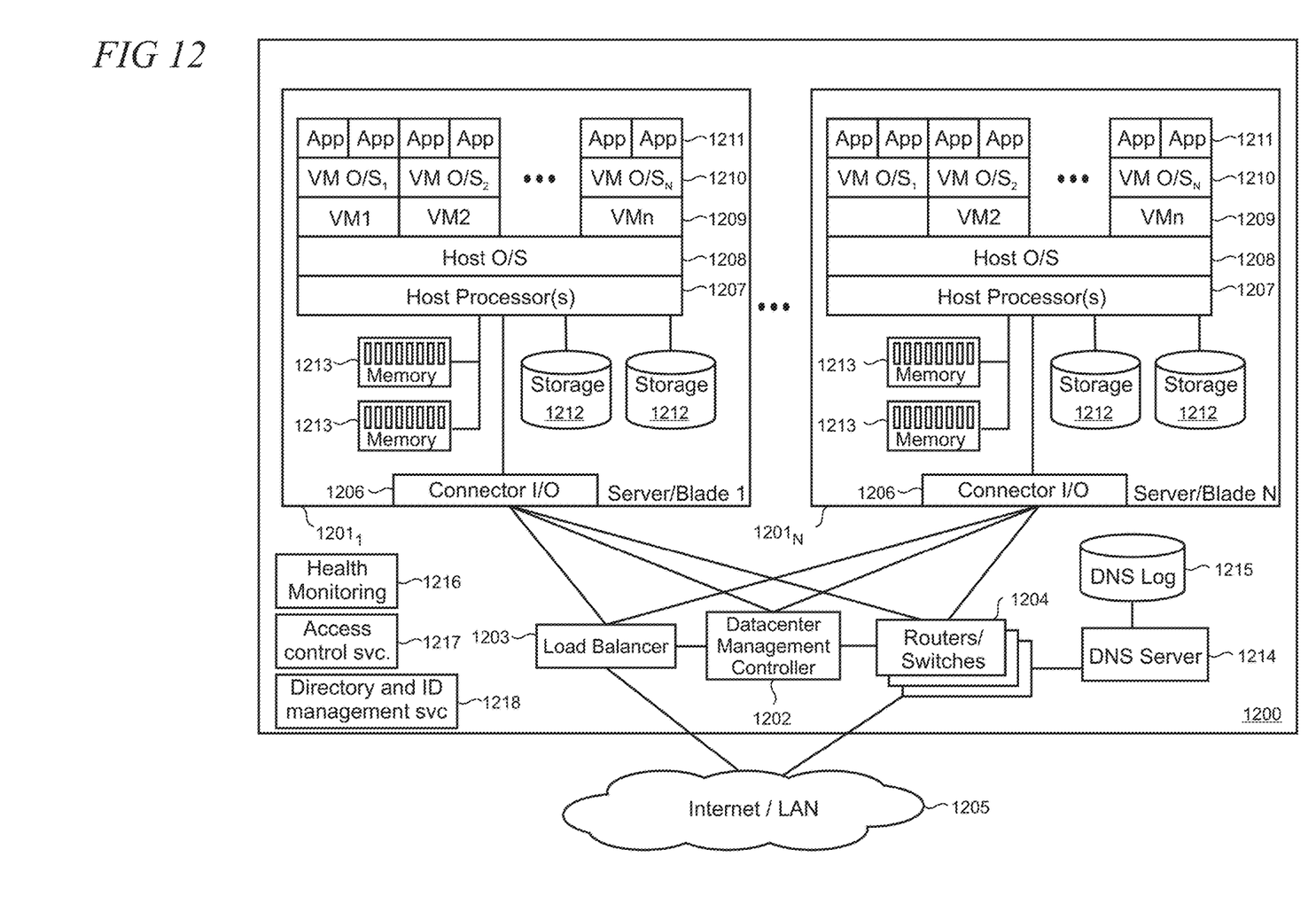
FIG. 12 is a block diagram of an illustrative datacenter that may be used at least in part to implement the present leveraging of RDMA for packet capture.

FIG. 12 is a high-level block diagram of an illustrative datacenter 1200 that provides cloud computing services or distributed computing services that may be used to implement the present leveraging of RDMA for packet capture. Datacenter 1200 may incorporate the features disclosed in FIGS. 1-10. A plurality of servers 1201 are managed by datacenter management controller 1202. Load balancer 1203 distributes requests and computing workloads over servers 1201 to avoid a situation wherein a single server may become overwhelmed. Load balancer 1203 maximizes available capacity and performance of the resources in datacenter 1200. Routers/switches 1204 support data traffic between servers 1201 and between datacenter 1200 and external resources and users (not shown) via an external network 1205, which may be, for example, a local area network (LAN) or the Internet.

Servers 1201 may be standalone computing devices, and/or they may be configured as individual blades in a rack of one or more server devices. Servers 1201 have an input/output (I/O) connector 1206 that manages communication with other database entities. One or more host processors 1207 on each server 1201 run a host operating system (O/S) 1208 that supports multiple virtual machines (VM) 1209. Each VM 1209 may run its own O/S so that each VM O/S 1210 on a server is different, or the same, or a mix of both. The VM O/Ss 1210 may be, for example, different versions of the same O/S (e.g., different VMs running different current and legacy versions of the Windows® operating system). In addition, or alternatively, the VM O/Ss 1210 may be provided by different manufacturers (e.g., some VMs running the Windows® operating system, while other VMs are running the Linux® operating system). Each VM 1209 may also run one or more applications (App) 1211. Each server 1201 also includes storage 1212 (e.g., hard disk drives (HDD)) and memory 1213 (e.g., RAM) that can be accessed and used by the host processors 1207 and VMs 1209 for storing software code, data, etc. In one embodiment, a VM 1209 may employ the data plane APIs as disclosed herein.

Datacenter 1200 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1209 on server $1201_1$ to run their applications 1211. When demand for an application 1211 increases, the datacenter 1200 may activate additional VMs 1209 on the same server $1201_1$ and/or on a new server $1201_N$ as needed. These additional VMs 1209 can be deactivated if demand for the application later drops.

Datacenter 1200 may offer guaranteed availability, disaster recovery, and back-up services. For example, the datacenter may designate one VM 1209 on server $1201_1$ as the primary location for the tenant's application and may activate a second VM 1209 on the same or a different server as a standby or back-up in case the first VM or server $1201_1$ fails. Database manager 1202 automatically shifts incoming user requests from the primary VM to the back-up VM without requiring tenant intervention. Although datacenter 1200 is illustrated as a single location, it will be understood that servers 1201 may be distributed to multiple locations across the globe to provide additional redundancy and disaster recovery capabilities. Additionally, datacenter 1200 may be an on-premises, private system that provides services to a single enterprise user or may be a publicly accessible, distributed system that provides services to multiple, unrelated customers and tenants or may be a combination of both.

Domain Name System (DNS) server 1214 resolves domain and host names into IP addresses for all roles, applications, and services in datacenter 1200. DNS log 1215 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 1216 monitors the health of the physical systems, software, and environment in datacenter 1200. Health monitoring 1216 provides feedback to datacenter managers when problems are detected with servers, blades, processors, or applications in datacenter 1200 or when network bandwidth or communications issues arise.

Access control service 1217 determines whether users are allowed to access particular connections and services on cloud service 1200. Directory and identity management service 1218 authenticates user credentials for tenants on datacenter 1200.

Figure 13:
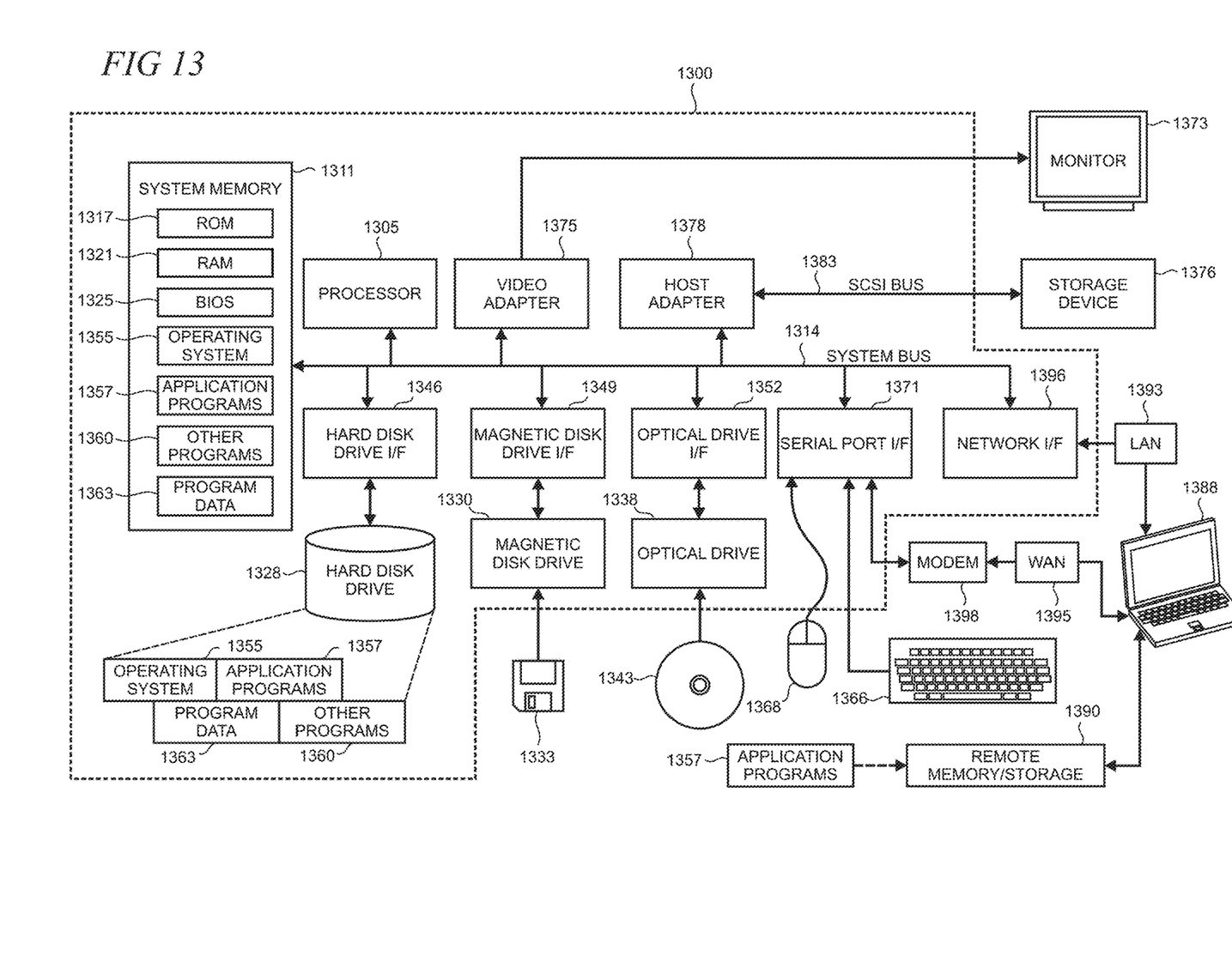
FIG. 13 is a simplified block diagram of an illustrative computer system that may be used at least in part to implement the present leveraging of RDMA for packet capture.

FIG. 13 is a simplified block diagram of an illustrative computer system 1300 such as a PC, client machine, or server with which the present leveraging of RDMA for packet capture may be implemented. Computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present user and device authentication for web applications. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 13 are illustrative and other means of establishing a communications link between the computers may be used depending on the specific requirements of an application of the present user and device authentication for web applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more hardware-based non-transitory computer-readable memory devices storing computer-executable instructions which, upon execution by one or more processors in a computing device, cause the computing device to:
    receive a stream of data packets at a top of rack (TOR) switch, in which the data packet stream has an associated line rate,
    at the TOR switch, identify the received data packets to a network interface controller (NIC) that is disposed in a server having a memory for processing using remote direct memory access (RDMA),
    from the TOR switch, transmit the identified data packets to the server to cause the NIC in the server to write the data to the memory using RDMA for packet capture at the line rate in response to receiving the identified data packets.

2. The one or more hardware-based non-transitory computer-readable memory devices of claim 1 in which the server is operatively coupled to the TOR switch.

3. The one or more hardware-based non-transitory computer-readable memory devices of claim 1 in which the packet capture includes all of the data packet stream including headers and payload.

4. The one or more hardware-based non-transitory computer-readable memory devices of claim 1 in which the identifying comprises RDMA information that is included in a header of each of the transmitted data packets.

5. The one or more hardware-based non-transitory computer-readable memory devices of claim 1 in which the TOR switch is operated in accordance with SONiC (Software for Open Networking in the Cloud).

6. A method for operating a datacenter, comprising:
    receiving packets of data at a switch;
    manipulating the received data packets at the switch to transform them into remote direct memory access (RDMA) data packets;
    sending the RDMA data packets to a network interface controller (NIC) disposed in a server that has at least one central processing unit (CPU) and at least one non-transitory memory; and
    at the NIC, receiving the RDMA data packets from the switch and performing write operations of the RDMA data packets to the non-transitory memory using RDMA to bypass the CPU during the write operations.

7. The method of claim 6 in which the switch is configured as a programmable top of rack (TOR) switch.

8. The method of claim 7 in which the TOR switch comprises an ASIC (application specific integrated circuit).

9. The method of claim 8 in which the TOR switch operates using SONiC (Software for Open Networking in the Cloud) through a switch abstraction interface (SAI) to the ASIC.

10. The method of claim 6 in which the data packet manipulation comprises adding an RDMA header to one or more of the received data packets.

11. The method of claim 6 in which the data packet manipulation comprises modifying a header of a received data packet to identify the packet to the NIC as processable using RDMA.

12. The method of claim 6 in which the data packet manipulation comprises encapsulating an RDMA transport packet to one or more of the received data packets.

13. The method of claim 6 further comprising performing the manipulating and sending at a line rate associated with the received data packets.

14. A computing device, comprising:
at least one processor; and
at least one non-transitory computer-readable storage media having computer-executable instructions stored thereon which, responsive to execution by the at least one processor, cause the computing device to
receive a stream of data packets at an associated line rate,
insert information in each of the received data packets to identify the data packet as processable using remote direct memory access (RDMA),
transmit the data packets with the RDMA identifying information for processing by a network interface controller (NIC) that is disposed in a server having a memory, to cause the NIC in the server to write the data to the memory using RDMA at the line rate in response to receiving the transmitted data packets with the RDMA identifying information.

15. The computing device of claim 14 in which the at least one processor is configured as an ASIC (application-specific integrated circuit) that interoperates with SONiC (Software for Open Networking in the Cloud) through a switch abstraction interface (SAI).

16. The computing device of claim 14 in which the data packets are modified by adding an RDMA header to each of the data packets.

17. The computing device of claim 14 in which the data packets are modified by encapsulating an RDMA transport packet in frames of Ethernet data.

18. The computing device of claim 14 in which the transmitted data packets are formatted in accordance with Internet wide area RDMA protocol (iWARP).

19. The computing device of claim 14 in which the transmitted data packets are formatted in accordance with RDMA over Converged Ethernet (RoCE) version 1 or RoCE version 2.

20. The computing device of claim 14 in which the transmitted data packets are formatted in accordance with InfiniBand.

\* \* \* \* \*